(12) United States Patent
    Luo et al.

(10) Patent No.: US 10,996,732 B2
(45) Date of Patent: May 4, 2021

(54) SLEW RATE CONTROLLED POWER SUPPLY AND ASSOCIATED CONTROL METHOD

(71) Applicant: Chengdu Monolithic Power Systems Co. Ltd., Chengdu (CN)

(72) Inventors: Suhua Luo, Hangzhou (CN); Lijie Jiang, Hangzhou (CN)

(73) Assignee: Chengdu Monolithic Power Systems Co., Ltd., Chengdu (CN)

(*) Notice: Subject to any disclaimer, the term of this patent is extended or adjusted under 35 U.S.C. 154(b) by 312 days.

(21) Appl. No.: 16/361,151

(22) Filed: Mar. 21, 2019

(65) Prior Publication Data

US 2019/0294227 A1  Sep. 26, 2019

(30) Foreign Application Priority Data

Mar. 23, 2018 (CN) .......................... 201810243276.0

(51) Int. Cl.
    *G06F 1/28* (2006.01)
    *G05F 1/46* (2006.01)

(52) U.S. Cl.
    CPC ............... *G06F 1/28* (2013.01); *G05F 1/465* (2013.01)

(58) Field of Classification Search
    None
    See application file for complete search history.

(56) References Cited

U.S. PATENT DOCUMENTS

| 7,728,749 | B2 * | 6/2010 | Sahu | H03M 1/004 |
| | | | | 341/144 |
| 8,384,365 | B2 * | 2/2013 | Maksimovic | H03K 7/08 |
| | | | | 323/283 |
| 8,791,676 | B2 * | 7/2014 | Liu | G06F 1/266 |
| | | | | 323/282 |
| 9,081,397 | B2 | 7/2015 | Jiang et al. | |
| 9,190,910 | B2 * | 11/2015 | Teh | H02M 3/1588 |
| 9,270,178 | B2 | 2/2016 | Jiang et al. | |
| 9,385,609 | B2 * | 7/2016 | Babazadeh | H02M 3/157 |
| 9,614,444 | B2 * | 4/2017 | Babazadeh | H02M 3/157 |
| 10,355,609 | B2 * | 7/2019 | Lazaro | G05F 1/575 |
| 10,523,107 | B2 * | 12/2019 | Xu | H02M 1/14 |
| 10,620,677 | B2 * | 4/2020 | Luo | G06F 1/28 |
| 10,734,899 | B2 * | 8/2020 | Fan | H02M 3/156 |
| 10,784,766 | B2 * | 9/2020 | Bhandarkar | H03K 5/24 |

(Continued)

*Primary Examiner* — Thomas J. Hiltunen
(74) *Attorney, Agent, or Firm* — Perkins Coie LLP

(57) ABSTRACT

A power supply has a reference regulation circuit and a voltage regulator. The reference regulation circuit receives a VID code and a slew rate command from a processor and regulates a reference voltage based on the VID code and the slew rate command. The voltage regulator converts an input voltage to an output voltage based on the reference voltage. The circuit has a $\Sigma$-$\Delta$ modulation unit to generate a count duration signal based on a target count signal, wherein the target count signal is generated by dividing a voltage regulation step by the slew rate command, both the target count signal and the count duration signal are digital signals, the target count signal represents a real number having an integer part and a decimal part, the count duration signal represents an integer number, the circuit further regulates the reference voltage based on the count duration signal and the VID code.

16 Claims, 7 Drawing Sheets

(56) References Cited

U.S. PATENT DOCUMENTS

| | | | | |
|---|---|---|---|---|
| 2010/0060257 A1* | 3/2010 | Azrai | ............... | G01R 19/0092 |
| | | | | 324/76.11 |
| 2014/0032942 A1* | 1/2014 | Takehara | ............. | H02M 3/156 |
| | | | | 713/300 |
| 2018/0173286 A1 | 6/2018 | Luo et al. | | |

* cited by examiner

SLEW RATE CONTROLLED POWER SUPPLY AND ASSOCIATED CONTROL METHOD

CROSS-REFERENCE TO RELATED APPLICATIONS

This application claims the benefit of CN application No. 201810243276.0, filed on Mar. 23, 2018, and incorporated herein by reference.

TECHNICAL FIELD

The present invention relates to electrical circuit, more particularly but not exclusively relates to a slew rate controlled power supply and associated method.

BACKGROUND

In computer systems, working voltage for a processor (e.g. CPU or GPU) is decided by a VID code (Voltage Identification Code), wherein the VID code is produced based on requirements of the processor. Different working modes of the processor corresponds to different VID codes, i.e. corresponds to different working voltages, and sometimes it needs a specified slew rate for the working voltage when the working voltage varies. Therefore, it is necessary to design a voltage regulator able to control an output voltage to vary with any specified slew rate till the output voltage equals to a voltage corresponding to the VID code, wherein the output voltage is the working voltage for the processor.

SUMMARY

It is one of the objects of the present invention to provide a slew rate controlled power supply and associated control method.

One embodiment of the present invention discloses power supply, configured to provide an output voltage to a processor, wherein the processor is configured to provide a VID code and a slew rate command, the power supply comprising: a reference regulation circuit, configured to receive the VID code and the slew rate command from the processor, and configured to regulate a reference voltage based on the VID code and the slew rate command; and a voltage regulator, coupled to the reference regulation circuit to receive the reference voltage, and configured to convert an input voltage to the output voltage based on the reference voltage; wherein the reference regulation circuit comprises: a first divider unit, configured to generate a target count signal by dividing a voltage regulation step by the slew rate command; and a $\Sigma$-$\Delta$ modulation unit, configured to generate a count duration signal based on the target count signal, wherein both the target count signal and the count duration signal are digital signals, the target count signal represents a real number having an integer part and a decimal part, the count duration signal represents an integer number, and the reference regulation circuit is further configured to regulate the reference voltage based on the count duration signal and the VID code.

Another embodiment of the present invention discloses control method for a power supply, wherein the power supply comprises a voltage regulator configured to convert an input voltage to an output voltage provided to a processor, and the processor is configured to provide a VID code and a slew rate command, the control method comprising: receiving the VID code and the slew rate command from the processor; generating a target count signal by dividing a voltage regulation step by the slew rate command; generating a count duration signal based on the target count signal, wherein both the target count signal and the count duration signal are digital signals, the target count signal represents a real number having an integer part and a decimal part, the count duration signal represents an integer number; and regulating the reference voltage based on the count duration signal and the VID code.

Yet another embodiment of the present invention discloses a power supply, configured to provide an output voltage to a processor, and the processor is configured to provide a VID code and a slew rate command, the power supply comprising: a reference regulation circuit, configured to receive the VID code and the slew rate command from the processor, configured to regulate a reference voltage based on the VID code and the slew rate command, and configured to generate a target count signal by dividing a voltage regulation step by the slew rate command; and a voltage regulator, coupled to the reference regulation circuit to receive the reference voltage, and configured to convert an input voltage to the output voltage based on the reference voltage; wherein the reference regulation circuit comprises: a $\Sigma$-$\Delta$ modulation unit, configured to generate a count duration signal based on the target count signal, wherein both the target count signal and the count duration signal are digital signals, the target count signal represents a real number having an integer part and a decimal part, and the count duration signal represents an integer number; a reference regulation unit, configured to provide a digital reference signal based on the VID code, the count duration signal and the voltage regulation step; and a DAC unit, configured to receive the digital reference signal and generate the reference voltage by converting the digital reference signal to an analog reference signal.

According to the embodiments of the present invention, the power supply is able to control the reference voltage varying with an arbitrary rate, and expensive high frequency clock is unnecessary.

BRIEF DESCRIPTION OF THE DRAWINGS

Non-limiting and non-exhaustive embodiments are described with reference to the following drawings.

The use of the same reference label in different drawings indicates the same or like components.

DETAILED DESCRIPTION

In the present application, numerous specific details are provided, such as examples of circuits, components, and methods, to provide a thorough understanding of embodiments of the invention. These embodiments are exemplary, not to confine the scope of the invention. Persons of ordinary skills in the art will recognize, however, that the invention can be practiced without one or more of the specific details. In other instances, well-known details are not shown or described to avoid obscuring aspects of the invention. Some phrases are used in some exemplary embodiments. However, the usage of these phrases is not confined to these embodiments.

The embodiments of the present invention disclose a power supply and associated control method. The power supply comprises a reference regulation circuit and a voltage regulator. The reference regulation circuit is configured to receive a VID code and a slew rate command, and configured to regulate a reference voltage based on the VID code and the slew rate command, wherein the slew rate command is produced by the processor and represents a specified rate the output voltage varies with. The voltage regulator is configured to convert an input voltage to the output voltage based on the reference voltage. The reference regulation circuit comprises a first divider unit and a $\Sigma$-$\Delta$ modulation unit, wherein the first divider unit is configured to generate a target count signal by dividing a voltage regulation step by the slew rate command, and the $\Sigma$-$\Delta$ modulation unit is configured to generate a count duration signal based on the target count signal, wherein both the target count signal and the count duration signal are digital signals, the target count signal represents a real number having an integer part and a decimal part, the count duration signal represents an integer number, and the reference regulation circuit is further configured to regulate the reference voltage based on the count duration signal and the VID code. According to the embodiments of the present invention, digital mode is used to regulate the reference voltage varying with an arbitrary rate based on the VID code and the slew rate command, so that expensive high frequency clock is unnecessary.

Figure 1:
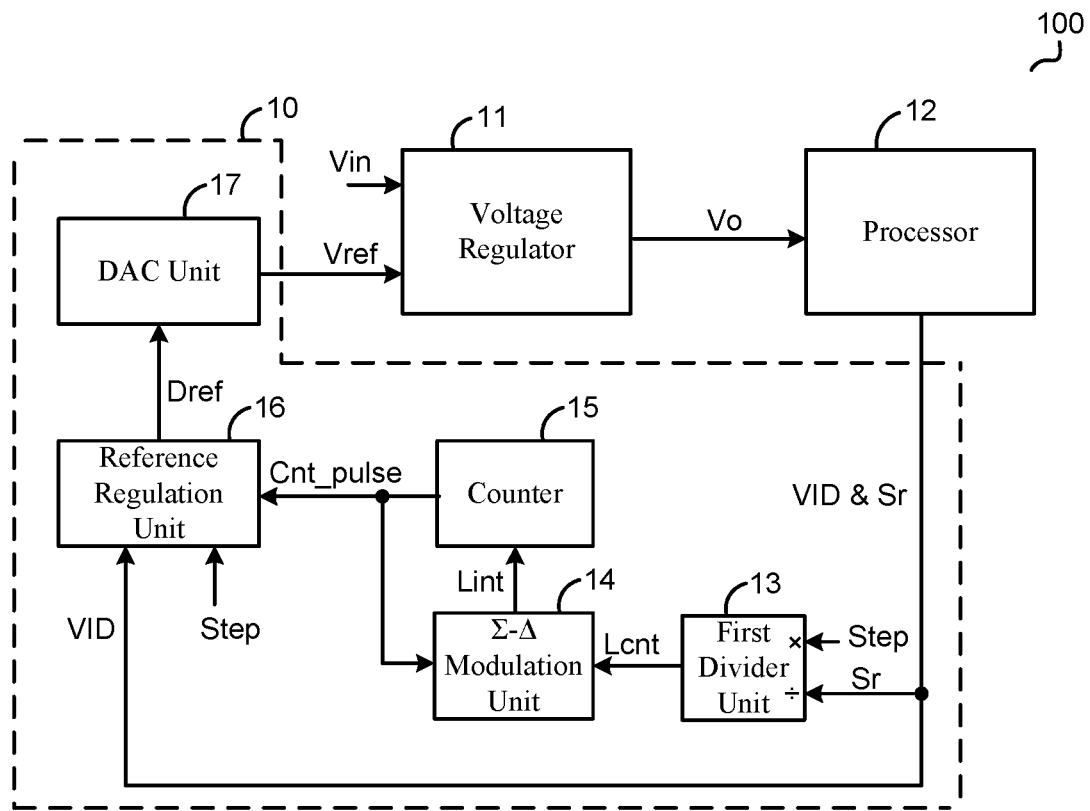
FIG. 1 illustrates a circuit block of a power supply 100 according to an embodiment of the present invention.

FIG. 1 illustrates a circuit block of a power supply 100 according to an embodiment of the present invention. The power supply 100 comprises a reference regulation circuit 10 and a voltage regulator 11. The reference regulation circuit 10 is configured to receive the VID code and the slew rate Sr from the processor 12, and configured to regulate the reference voltage Vref based on the VID code and the slew rate Sr. The voltage regulator 11 is coupled to the reference regulation circuit 10 to receive the reference Vref, and the voltage regulator 11 is configured to convert the input voltage Vin to the output voltage Vo and supply power to the processor 12.

In one embodiment, the reference regulation circuit 10 comprises a first divider unit 13 and a $\Sigma$-$\Delta$ modulation unit 14. The first divider unit 13 has a first input terminal, a second input terminal and an output terminal, wherein the first input terminal is configured to receive a voltage regulation step, the second input terminal is configured to receive the slew rate Sr, the first divider unit 13 is configured to generate a target count signal Lcnt by dividing the voltage regulation step Step by the slew rate Sr. The $\Sigma$-$\Delta$ modulation unit 14 has an input terminal and an output terminal, wherein the input terminal is configured to receive the target count signal Lcnt, the output terminal is configured to output a count duration signal Lint based on the target count signal Lcnt, wherein the target count signal Lcnt and the count duration signal Lint are digital signals, the target count signal Lcnt represents a real number having an integer part and a decimal part, the count duration signal Lint represents an integer number. The reference regulation circuit 10 is further configured to regulate the reference voltage Vref based on the count duration signal Lint and the VID code. In one embodiment, the reference regulation circuit 10 is configured to generate a regulation period based on the count duration signal Lint, and configured to increase or decrease the reference voltage Vref based on the voltage regulation step Step during each regulation period. In one embodiment, the $\Sigma$-$\Delta$ modulation unit 14 is configured to update the count duration signal Lint under the control of a count indication signal Cnt_pulse, e.g. the $\Sigma$-$\Delta$ modulation unit 14 is triggered when the count indication signal Cnt_pulse changes to high level, then the $\Sigma$-$\Delta$ modulation unit starts to update the count duration signal Lint.

In one embodiment, the reference regulation circuit 10 further comprises a count unit 15. The count unit 15 is configured to receive the count duration signal Lint and generate the count indication signal Cnt_pulse based on the count duration signal Lint. In one embodiment, the count unit 15 is configured to be reset when a count length of the count unit 15 is equal to a duration corresponding to the count duration signal Lint, meanwhile, the count indication signal Cnt_pulse outputs a pulse signal.

In one embedment, the reference regulation circuit 10 further comprises a reference regulation unit 16. The reference regulation unit 16 is configured to receive the VID code, the voltage regulation step Step and the count indication signal Cnt_pulse, and is configured to provide a digital reference signal Dref. The reference regulation unit 16 is configured to generate the regulation period based on the count duration signal Lint, wherein during each regulation period, when the reference regulation circuit 10 is configured to increase the digital reference signal Dref, the digital reference signal Dref is configured to be increased by one voltage regulation step Step if the digital reference signal Dref is smaller than the VID code, and when the reference regulation circuit 10 is configured to decrease the digital reference signal Dref, the digital reference signal Dref is configured to decrease one voltage regulation step Step if the digital reference signal Dref is larger than the VID code. In one embodiment, the regulation period equals to the count length of the count unit 15 when the count length reaches the duration corresponding to the count duration signal Lint. In one embodiment, when the count indication signal Cnt_pulse changes to a first state, e.g. changes to high level, the reference regulation unit 16 is configured to regulate the digital reference signal Dref based on the VID code and the voltage regulation step Step.

In one embodiment, the reference regulation circuit 10 further comprises a DAC (Digital-to-Analogue Conversion) unit 17. The DAC unit 17 is configured to receive the digital reference signal Dref and convert the digital reference signal Dref to the reference signal Vref.

Figure 2:
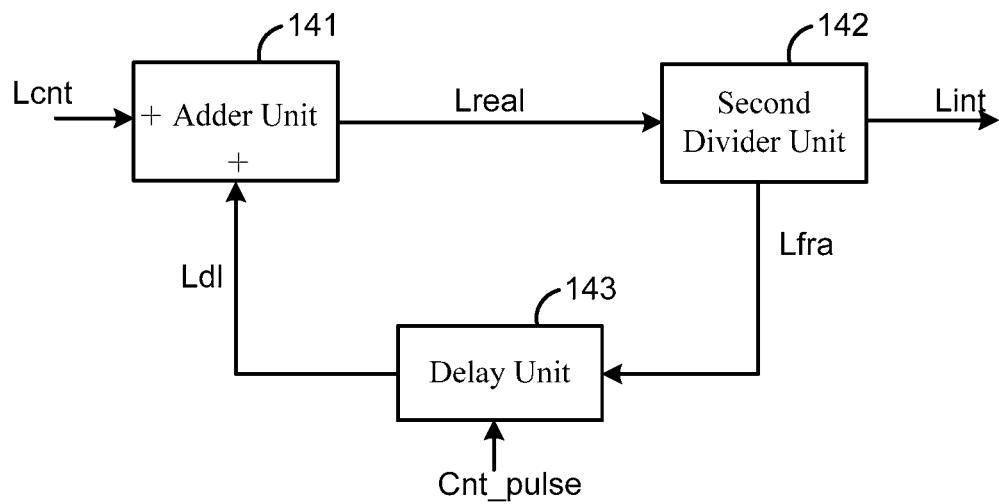
FIG. 2 schematically illustrates a $\Sigma$-$\Delta$ modulation unit 14 according to an embodiment of the present invention.

FIG. 2 schematically illustrates a $\Sigma$-$\Delta$ modulation unit 14 according to an embodiment of the present invention. In the embodiment illustrated in FIG. 2, the $\Sigma$-$\Delta$ modulation unit 14 comprises an adder unit 141, a second divider unit 142 and a delay unit 143. The adder unit 141 is configured to receive the target count signal Lcnt and a delay signal Ldl to produce an adding signal Lreal, wherein the adding signal Lreal represents a real number having an integer part and a decimal part. The second divider unit 142 is configured to receive the adding signal Lreal and divide the integer part of the adding signal Lreal from the decimal part of the adding signal Lreal, and the second divider unit 142 is configured to generate the count duration signal Lint based on the integer part of the adding signal Lreal and configured to generate a cycle signal Lfra based on the decimal part of the adding signal Lreal. The delay unit 143 is configured to generate the delay signal Ldl by delaying the cycle signal Lfra, and configured to provide the delay signal Ldl to the adder unit 141. In one embodiment, a delay time of the delay unit 143 is equal to the count length of the count unit 15 when the count length reaches the duration corresponding to the count duration signal Lint. In one embodiment, when the count indication signal Cnt_pulse becomes logic high, the delay unit 142 is configured to update the delay signal Ldl and provide it to the adder unit 141.

Figure 3:
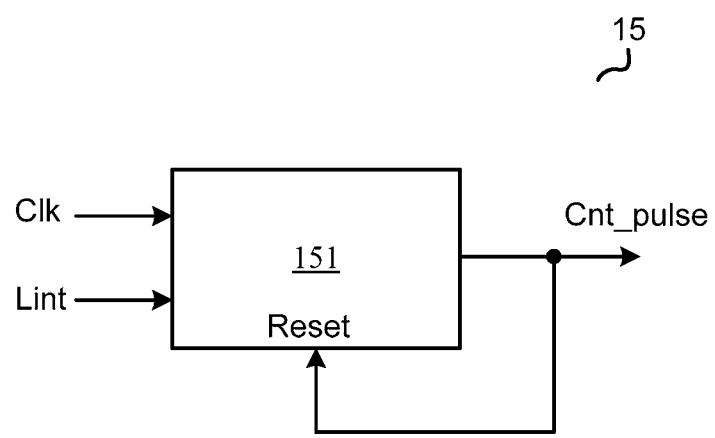
FIG. 3 schematically illustrates a count unit 15 according to an embodiment of the present invention.

FIG. 3 schematically illustrates a count unit 15 according to an embodiment of the present invention. The count unit 15 comprises a counter 151. In one embodiment, the counter 151 is configured to receive a clock signal Clk and the count duration signal Lint, and the counter 151 is configured to count once at a rising edge or a falling edge of the clock signal Clk until the count length of the counter 151 equals to the count duration signal Lint, then the counter 151 outputs the count indication signal Cnt_pulse and the counter 151 is configured to be reset, the count length of the counter 151 is configured to be reset to zero. In another embodiment, the original count length of the counter 151 is equal to the count duration signal Lint, the counter 151 is configured to count once at a rising edge or a falling edge of the clock signal Clk until the count length is equal to zero, then the counter 151 outputs the count indication signal Cnt_pulse and the counter 151 is configured to be reset, the count length of the counter 151 is configured to be reset to a value equal to the count duration signal Lint.

Figure 4:
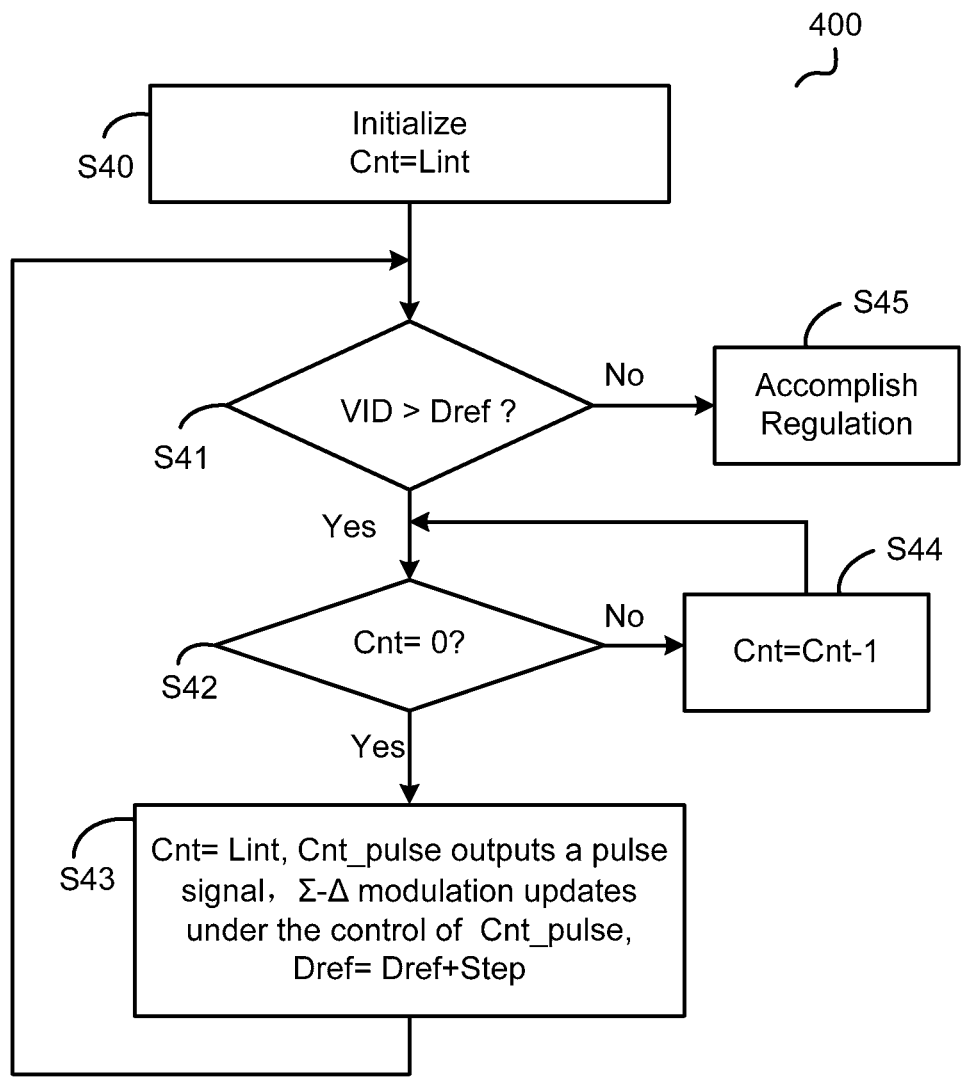
FIG. 4 shows a flow chart 400 illustrating a method to increase a digital reference signal Dref according to an embodiment of the present invention.

FIG. 4 shows a flow chart 400 illustrating a method to increase the digital reference signal Dref according to an embodiment of the present invention. The method comprises steps S40-S45.

At step S40, initializing the count length Cnt equal to the count duration signal Lint.

At step S41, judging whether the VID code is larger than the digital reference signal Dref. Wherein when increasing the digital reference signal Dref, if the VID code is larger than the digital reference signal Dref, enter into step S42, or else, enter into step S45, accomplish the regulation.

At step S42, judging whether the count length Cnt is zero. If the count length Cnt is zero, enter into step S43, if the count length Con is not zero, enter into step S44, the count length subtracts 1, i.e. Cnt=Cnt−1, then enter into the step S42 again.

At step S43, the count indication signal Cnt_pulse is configured to output a pulse signal, the Σ-Δ modulation unit 14 is configured to update the count duration signal Lint under the control of the count indication signal Cnt_pulse, the digital reference signal Dref is configured to be increased by a voltage regulation step Step, i.e. the digital reference signal Dref is equal to Dref+Step, the count length Cnt is configured to be reset equal to the updated count duration signal Lint, then enters into step S41.

Note that in the flow chart described above, the box functions may also be implemented with different order as shown in FIG. 4. For example, two successive box functions may be executed meanwhile, or sometimes the box functions may be executed in reverse order.

Figure 5:
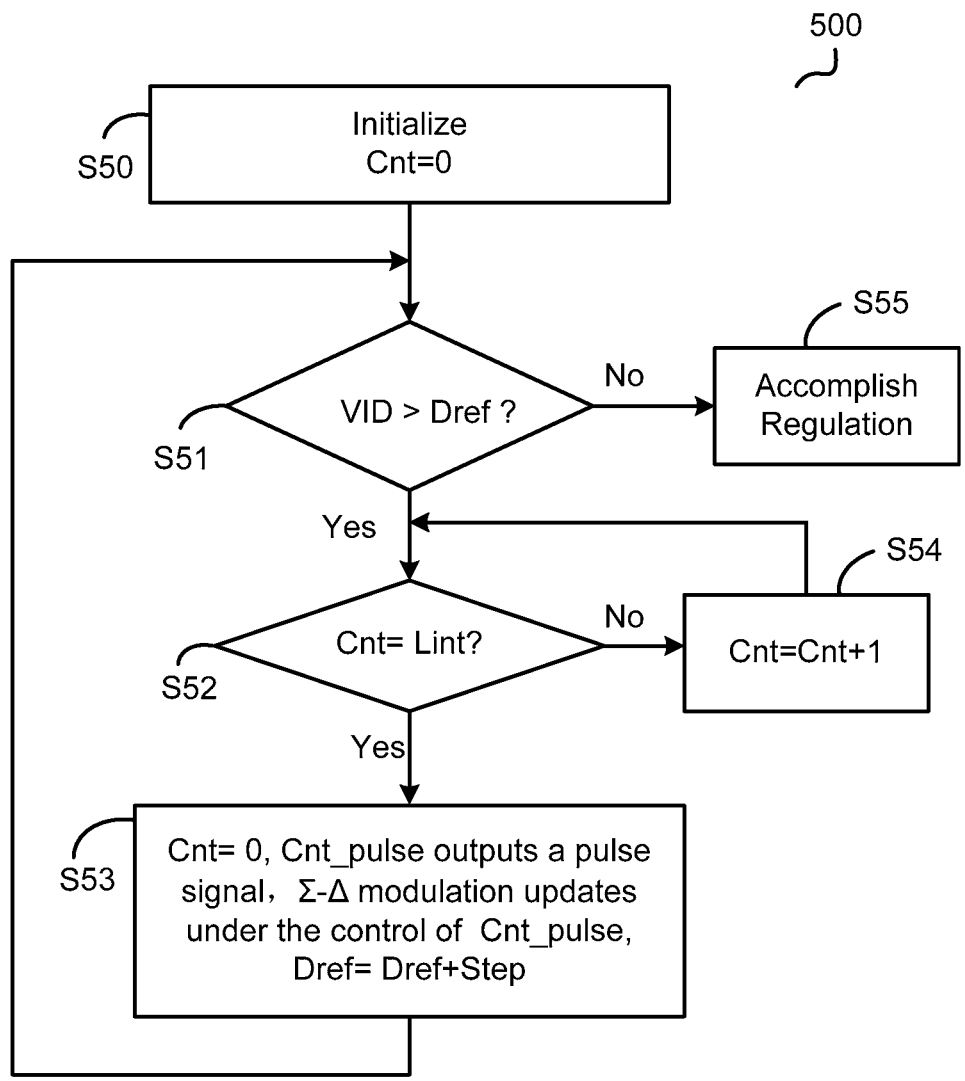
FIG. 5 shows a flow chart 500 illustrating a method to increase the digital reference signal Dref according to another embodiment of the present invention.

FIG. 5 shows a flow chart 500 illustrating a method to increase a digital reference signal Dref according to another embodiment of the present invention. The method comprises steps S50-S55.

At step S50, initializing the count length Cnt equal to zero.

At step S51, judging whether the VID code is larger than the digital reference signal Dref. Wherein when increasing the digital reference signal, if the VID code is larger than the digital reference signal Dref, enter into step S52, or else, enter into step S55, accomplish the regulation.

At step S52, judging whether the count length Cnt is equal to the count duration signal Lint. If the count length Cnt is equal to the count duration signal Lint, enter into step S53, if the count length Cnt is not equal to the count duration signal Lint, enter into step S54, the count length Cnt pluses 1, i.e. Cnt=Cnt+1, then enter into step S52 again.

At step S53, the count indication signal Cnt_pulse is configured to output a pulse signal, the Σ-Δ modulation unit 14 is configured to update the count duration signal Lint under the control of the count indication signal Cnt_pulse, the digital reference signal Dref is configured to be increased by a voltage regulation step Step, i.e. the digital reference signal Dref is equal to Dref+Step, the count length Cnt is configured to be reset to zero, then enters into step S51.

Note that in the flow chart described above, the box functions may also be implemented with different order as shown in FIG. 5. For example, two successive box functions may be executed meanwhile, or sometimes the box functions may be executed in reverse order.

Figure 6:
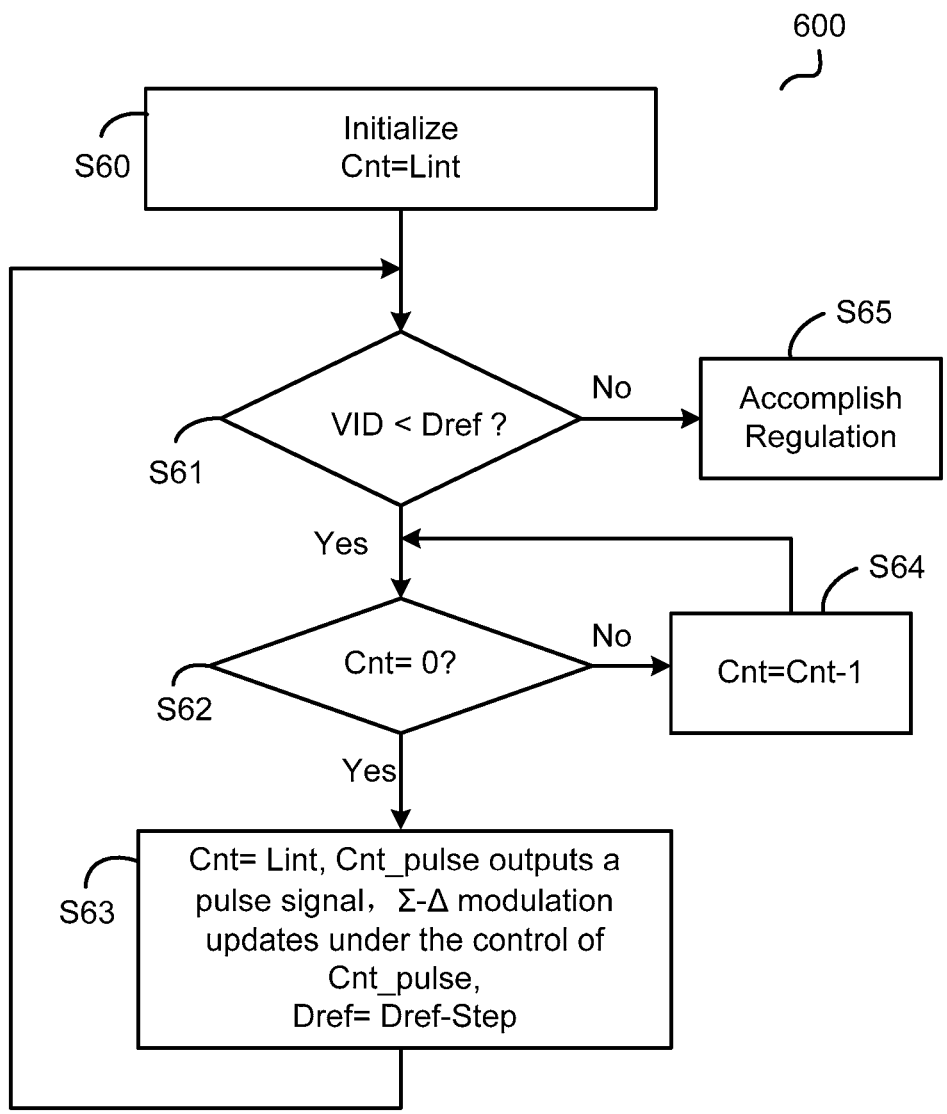
FIG. 6 shows a flow chart 600 illustrating a method to decrease the digital reference signal Dref according to an embodiment of the present invention.

FIG. 6 shows a flow chart 600 illustrating a method to decrease a digital reference signal Dref according to an embodiment of the present invention. The method comprises steps S60-S61.

At step S60, initializing the count length Cnt equal to the count duration signal Lint.

At step S61, judging whether the VID code is smaller than the digital reference signal Dref. Wherein when decreasing the digital reference signal Dref, if the VID code is smaller than the digital reference signal Dref, enter into step S62, or else, enters into step S65, accomplish the regulation.

At step S62, judging whether the count length Cnt is zero, if the count length Cnt is zero, enter into step S63, if the count length Cnt is not zero, enter into step S64, the count length Cnt subtracts 1, i.e. Cnt=Cnt−1, then enter into step S62 again.

At step S63, the count indication signal Cnt_pulse is configured to output a pulse signal, the Σ-Δ modulation unit 14 is configured to update the count duration signal Lint under the control of the count indication signal Cnt_pulse, the digital reference signal Dref is configured to be decreased by a voltage regulation step Step, i.e. the digital reference signal Dref is equal to Dref−Step, the count length Cnt is configured to be reset equal to the count duration signal Lint, then enters into step S61.

Note that in the flow chart described above, the box functions may also be implemented with different order as shown in FIG. 6. For example, two successive box functions may be executed meanwhile, or sometimes the box functions may be executed in reverse order.

Figure 7:
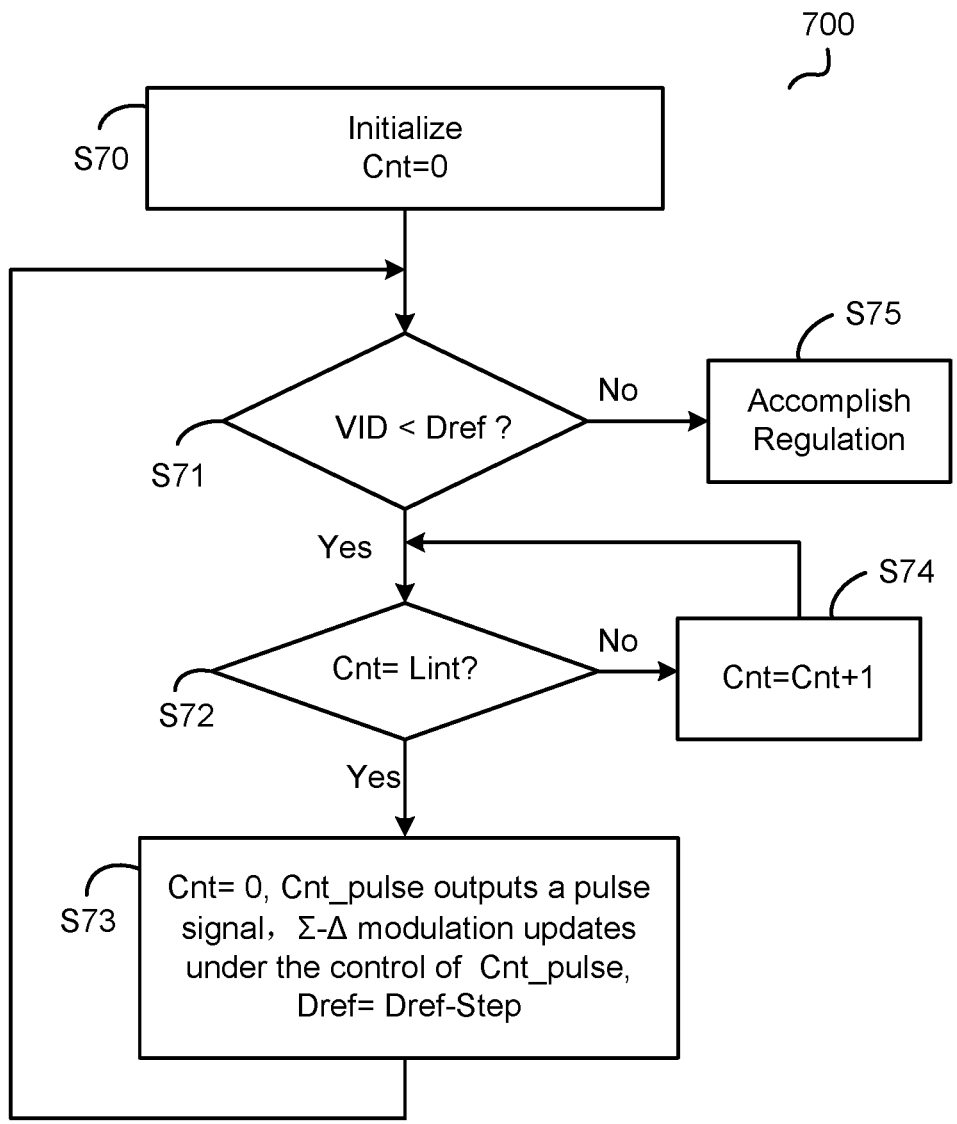
FIG. 7 shows a flow chart 700 illustrating a method to decrease the digital reference signal Dref according to another embodiment of the present invention.

FIG. 7 shows a flow chart 700 illustrating a method to decrease a digital reference signal Dref according to another embodiment of the present invention. The method comprises steps S70-S73, At step S70, initializing the count length Cnt equal to zero.

At step S71, judging whether the VID code is smaller than the digital reference signal Dref. Wherein when decreasing the digital reference signal, if the VID code is smaller than the digital reference signal Dref, enter into step S72, or else, enter into step S75, accomplish the regulation.

At step S72, judging whether the count length Cnt is equal to the count duration signal Lint. If the count length Cnt is equal to the count duration signal Lint, enter into step S73, if the count length Cnt is not equal to the count duration signal Lint, enter into step S74, the count length Cnt pluses 1, i.e. Cnt=Cnt+1, then enter into step S72 again.

At step S73, the count indication signal Cnt_pulse is configured to output a pulse signal, the Σ-Δ modulation unit 14 is configured to update the count duration signal Lint under the control of the count indication signal Cnt_pulse, the digital reference signal Dref is configured to be decreased by a voltage regulation step Step, i.e. the digital reference signal Dref is equal to Dref−Step, the count length Cnt is configured to be reset to zero, then enters into step S71.

Note that in the flow chart described above, the box functions may also be implemented with different order as shown in FIG. 5. For example, two successive box functions may be executed meanwhile, or sometimes the box functions may be executed in reverse order.

Figure 8:
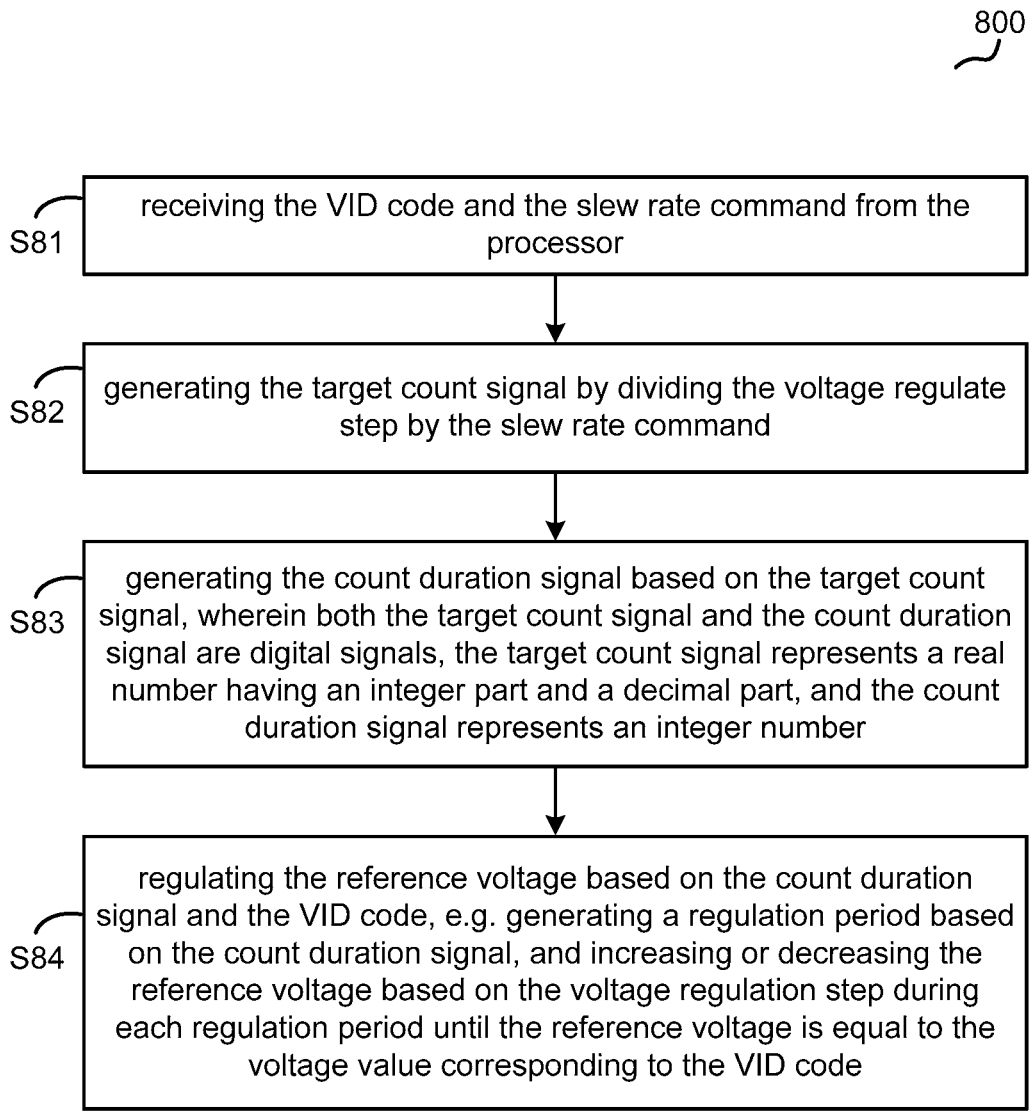
FIG. 8 shows a flow chart 800 illustrating a control method for the power supply according to an embodiment of the present invention.

FIG. 8 shows a flow chart 800 illustrating a control method for a power supply according to an embodiment of the present invention. Wherein the power supply is configured to provide an output to a power supply, and the power supply is configured to provide a VID code and a slew rate. The method comprises steps S81-S84.

At step S81, receiving the VID code and the slew rate command from the processor.

At step S82, generating the target count signal by dividing the voltage regulation step by the slew rate command.

At step S83, generating the count duration signal based on the target count signal, wherein both the target count signal and the count duration signal are digital signals, the target count signal represents a real number having an integer part and a decimal part, and the count duration signal represents an integer number.

At step S84, regulating the reference voltage based on the count duration signal and the VID code, e.g. generating a regulation period based on the count duration signal, and increasing or decreasing the reference voltage based on the voltage regulation step during each regulation period until the reference voltage is equal to the voltage value corresponding to the VID code.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. A power supply, configured to provide an output voltage to a processor, wherein the processor is configured to provide a VID code and a slew rate command, the power supply comprising:
a reference regulation circuit, configured to receive the VID code and the slew rate command from the processor, and configured to regulate a reference voltage based on the VID code and the slew rate command; and
a voltage regulator, coupled to the reference regulation circuit to receive the reference voltage, and configured to convert an input voltage to the output voltage based on the reference voltage; wherein
the reference regulation circuit comprises:
a first divider unit, configured to generate a target count signal by dividing a voltage regulation step by the slew rate command; and
a Σ-Δ modulation unit, configured to generate a count duration signal based on the target count signal, wherein both the target count signal and the count duration signal are digital signals, the target count signal represents a real number having an integer part and a decimal part, the count duration signal represents an integer number, and the reference regulation circuit is further configured to regulate the reference voltage based on the count duration signal and the VID code.

2. The power supply of claim 1, wherein the reference regulation circuit is further configured to generate a regulation period based on the count duration signal, and further configured to increase or decrease the reference voltage based on the voltage regulation step during the regulation period until the reference voltage is equal to a voltage corresponding to the VID code.

3. The power supply of claim 1, wherein the Σ-Δ modulation circuit comprises:
an adder circuit, configured to receive the target count signal and a delay signal, and configured to generate an adding signal based on the target count signal and the delay signal, wherein the adding signal represents a real number having an integer part and a decimal part;
a second divider unit, configured to receive the adding signal and divide the integer part of the adding signal from the decimal part of the adding signal, configured to generate the count duration signal based on the integer part of the adding signal, and configured to generate a cycle signal based on the decimal part of the adding signal; and
a delay unit, configured to receive the cycle signal, and configured to generate the delay signal by delaying the cycle signal.

4. The power supply of claim 3, further comprising a count unit, wherein a delay time of the delay unit is equal to a count length of the count unit when the count length reaches a duration corresponding to the count duration signal.

5. The power supply of claim 1, wherein the reference regulation circuit further comprises:
a count unit, configured to provide a count indication signal, wherein when a count length of the count unit reaches a duration corresponding to the count duration signal, the count unit is configured to be reset, and the count indication signal changes to high level;
a reference regulation unit, configured to receive the VID code, the voltage regulation step and the count indication signal, and configured to provide a digital reference signal, wherein when the count indication signal changes to high level, the reference regulation unit is configured to regulate the digital reference signal based on the VID code and the voltage regulation step; and
a DAC unit, configured to generate the reference voltage by converting the digital reference signal to an analog reference signal.

6. The power supply of claim 5, wherein when the reference regulation unit is configured to increase the digital reference signal, the digital reference signal is configured to be increased by one voltage regulation step if the digital reference signal is smaller than the VID code, and when the reference regulation unit is configured to decrease the digital reference signal, the digital reference signal is configured to be decreased by one voltage regulation step if the digital reference signal is larger than the VID code.

7. A control method for a power supply, wherein the power supply comprises a voltage regulator configured to convert an input voltage to an output voltage provided to a processor, and the processor is configured to provide a VID code and a slew rate command, the control method comprising:
receiving the VID code and the slew rate command from the processor;
generating a target count signal by dividing a voltage regulation step by the slew rate command;
generating a count duration signal based on the target count signal, wherein both the target count signal and the count duration signal are digital signals, the target count signal represents a real number having an integer part and a decimal part, the count duration signal represents an integer number; and
regulating the reference voltage based on the count duration signal and the VID code.

8. The control method of claim 7, wherein the step of regulating the reference voltage based on the count duration signal and the VID code further comprises:
generating a regulation period based on the count duration signal, and increasing or decreasing the reference voltage based on the voltage regulation step during the regulation period until the reference voltage is equal to a voltage corresponding to the VID code.

9. The control method of claim 7, wherein the step of generating a count duration signal based on the target count signal further comprises:
generating an adding signal by adding the target count signal with a delay signal, wherein the adding signal represents a real number having an integer part and a decimal part;
dividing the integer part of the adding signal from the decimal part of the adding signal, and generating the count duration signal based on the integer part of the adding signal, and generating a cycle signal based on the decimal part of the adding signal; and
generating the delay signal by delaying the cycle signal.

10. The control method of claim 7, wherein the step of regulating the reference voltage based on the count duration signal and the VID code comprises:
counting based on the count duration signal;
providing a digital reference signal based on the VID code, wherein if the digital reference signal is smaller than the VID code and a count length equals to a duration corresponding to the count duration signal, increasing the digital reference signal by one voltage regulation step and recounting; and
generating the reference voltage by converting the digital reference signal to an analog reference signal.

11. The control method of claim 7, wherein the step of regulating the reference voltage based on the count duration signal and the VID code comprises:
counting based on the count duration signal;
providing a digital reference signal based on the VID code, wherein if the digital reference signal is larger than the VID code and a count length equals to a duration corresponding to the count duration signal, decreasing the digital reference signal by one voltage regulation step and recounting; and
generating the reference voltage by converting the digital reference signal to an analog reference signal.

12. A power supply, configured to provide an output voltage to a processor, and the processor is configured to provide a VID code and a slew rate command, the power supply comprising:
a reference regulation circuit, configured to receive the VID code and the slew rate command from the processor, configured to regulate a reference voltage based on the VID code and the slew rate command, and configured to generate a target count signal by dividing a voltage regulation step by the slew rate command; and
a voltage regulator, coupled to the reference regulation circuit to receive the reference voltage, and configured to convert an input voltage to the output voltage based on the reference voltage; wherein
the reference regulation circuit comprises:
a Σ-Δ modulation unit, configured to generate a count duration signal based on the target count signal, wherein both the target count signal and the count duration signal are digital signals, the target count signal represents a real number having an integer part and a decimal part, and the count duration signal represents an integer number;
a reference regulation unit, configured to provide a digital reference signal based on the VID code, the count duration signal and the voltage regulation step; and
a DAC unit, configured to receive the digital reference signal and generate the reference voltage by converting the digital reference signal to an analog reference signal.

13. The power supply of claim 12, wherein the Σ-Δ modulation unit comprises:
an adder circuit, configured to receive the target count signal and a delay signal, and configured to generate an adding signal based on the target count signal and the delay signal, wherein the adding signal represents a real number having an integer part and a decimal part;
a divider unit, configured to receive the adding signal and divide the integer part of the adding signal from the decimal part of the adding signal, configured to generate the count duration signal based on the integer part of the adding signal, and configured to generate a cycle signal based on the decimal part of the adding signal; and
a delay unit, configured to generate the delay signal by delaying the cycle signal.

14. The power supply of claim 12, wherein the reference regulation unit is further configured to generate a regulation period based on the count duration signal, and when the reference regulation unit is configured to increase the digital reference signal during the regulation period, the digital reference signal is configured to be increased by a voltage regulation step if the digital reference signal is smaller than the VID code.

15. The power supply of claim 12, wherein the reference regulation unit is further configured to generate a regulation period based on the count duration signal, and when the reference regulation unit is configured to decrease the digital reference signal during the regulation period, the digital reference signal is configured to decrease a voltage regulation step if the digital reference signal is larger than the VID code.

16. The power supply of claim 12, further comprising a count unit, and wherein when a count length of the count unit is equal to a duration corresponding to the count duration signal, the count unit is configured to be reset, and the Σ-Δ modulation unit is configured to update the target count signal.

* * * * *